N. E. ROYER.
WATER POWER MECHANISM.
APPLICATION FILED APR. 17, 1918.
1,325,379.
Patented Dec. 16, 1919.
6 SHEETS—SHEET 2.
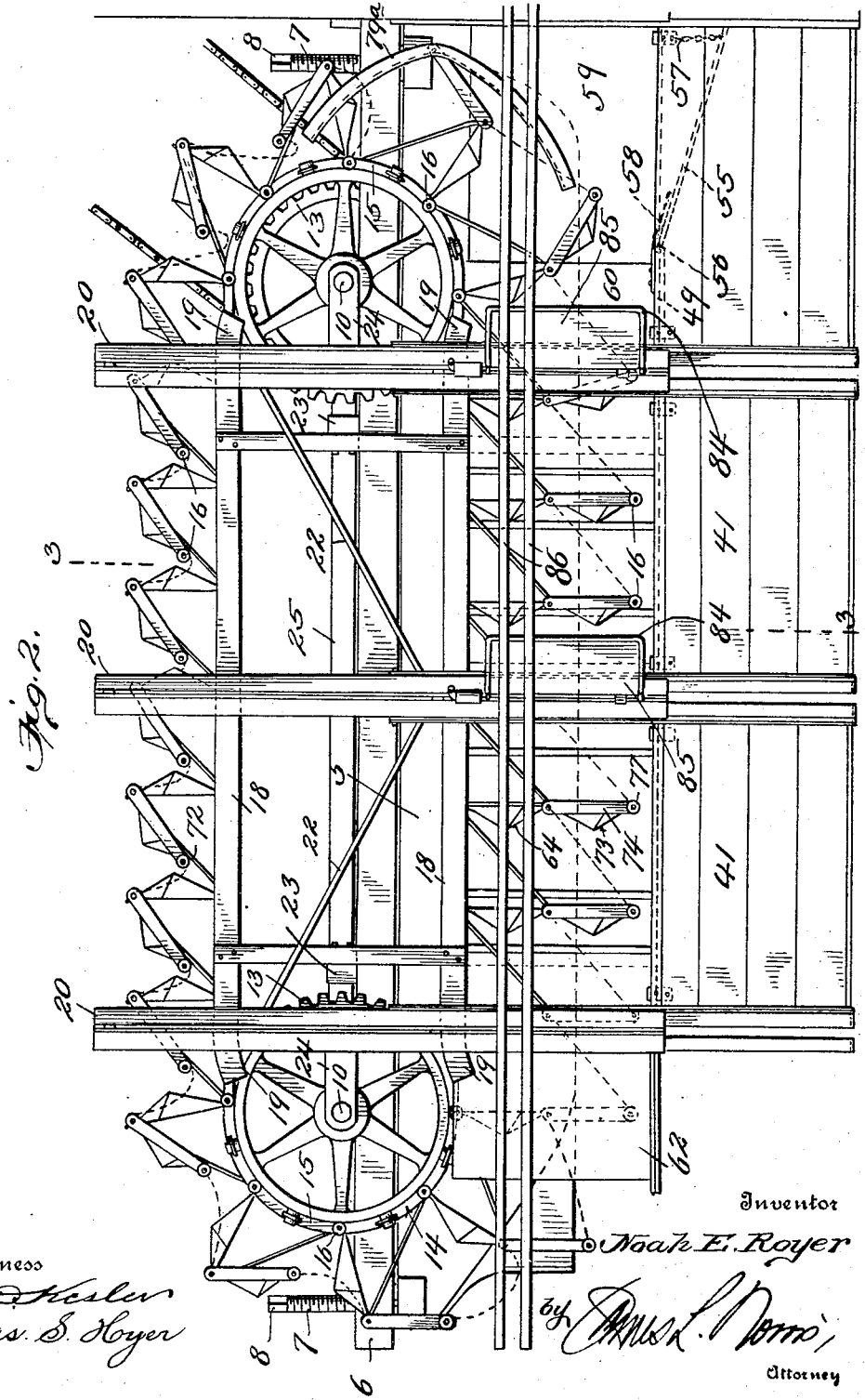

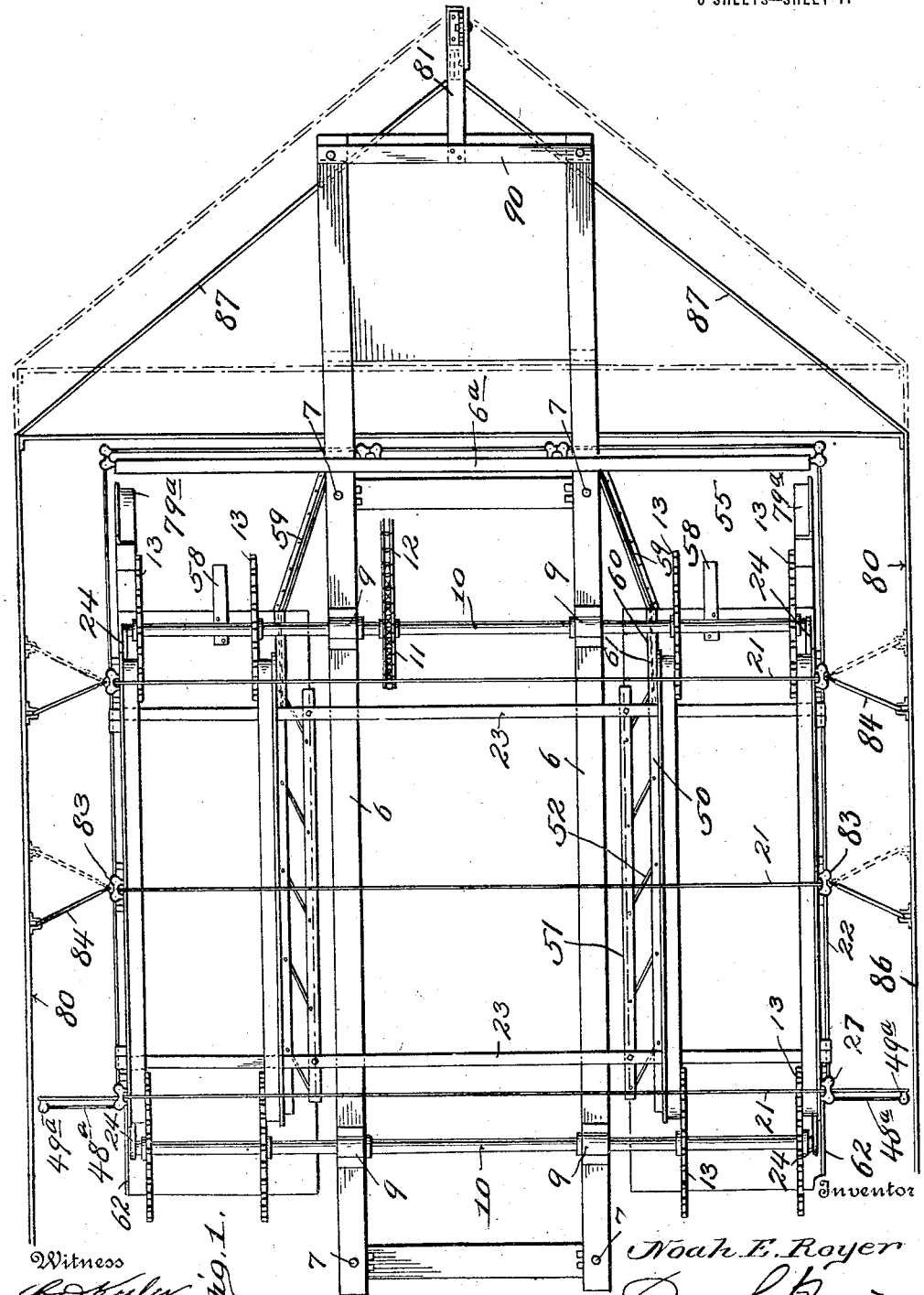

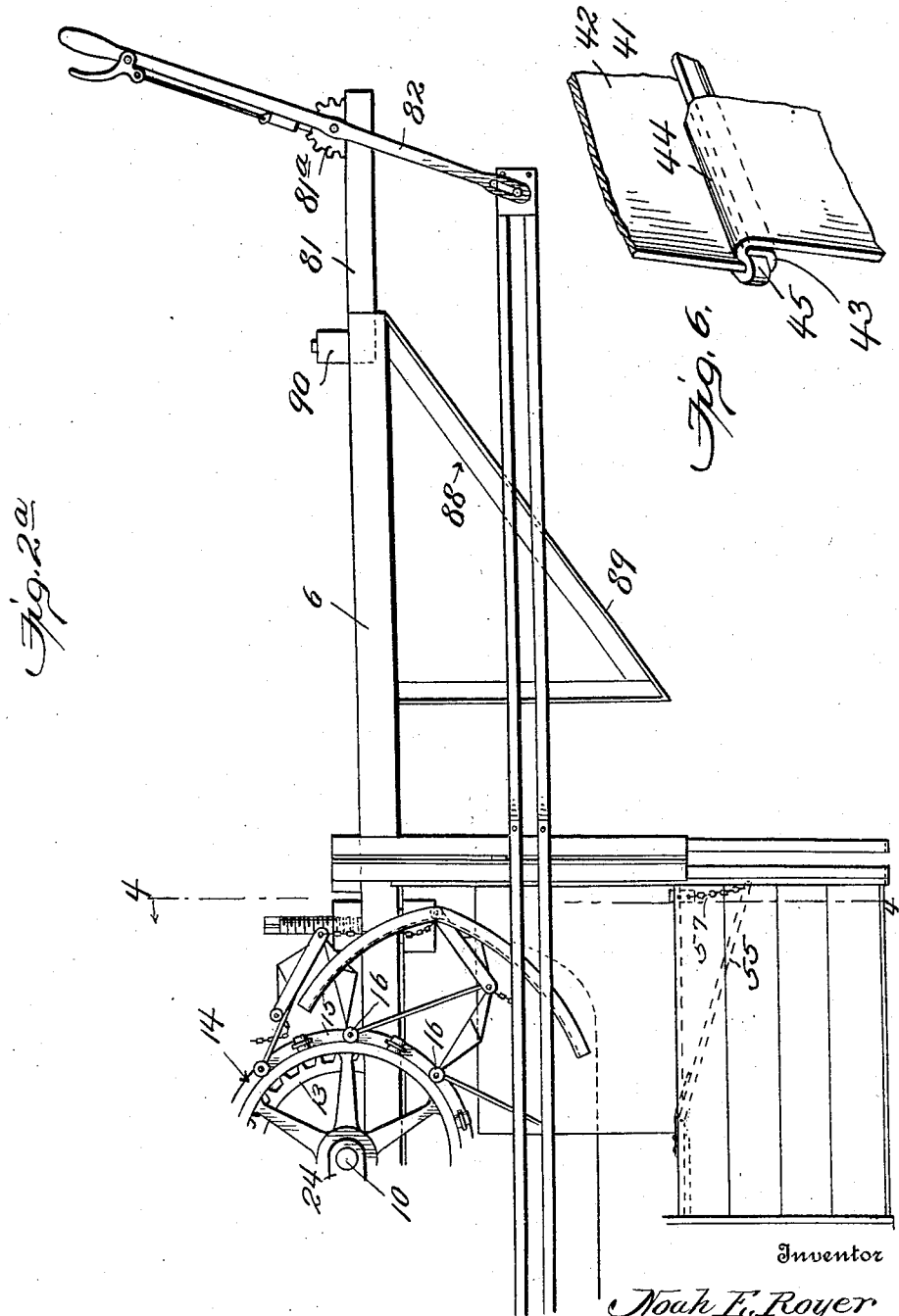

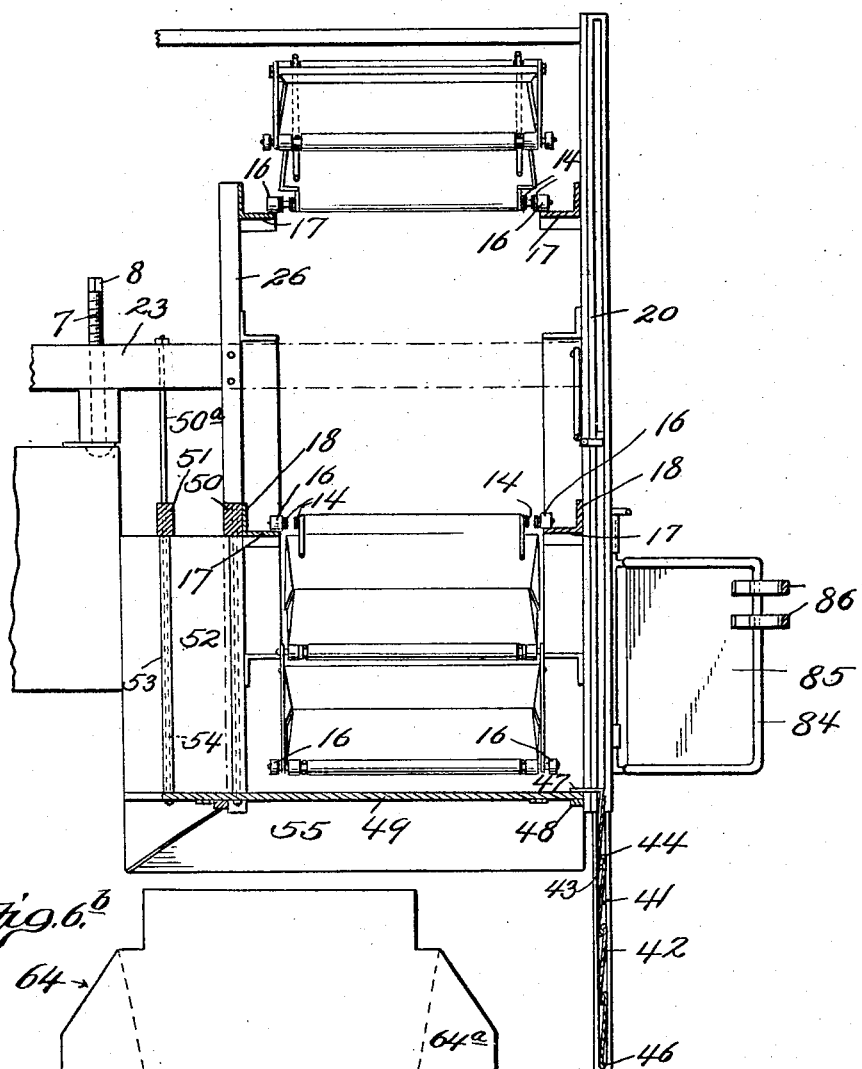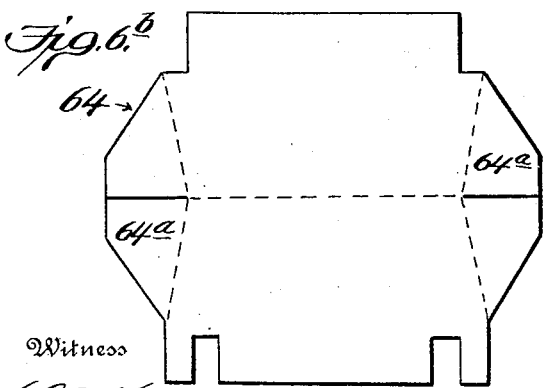

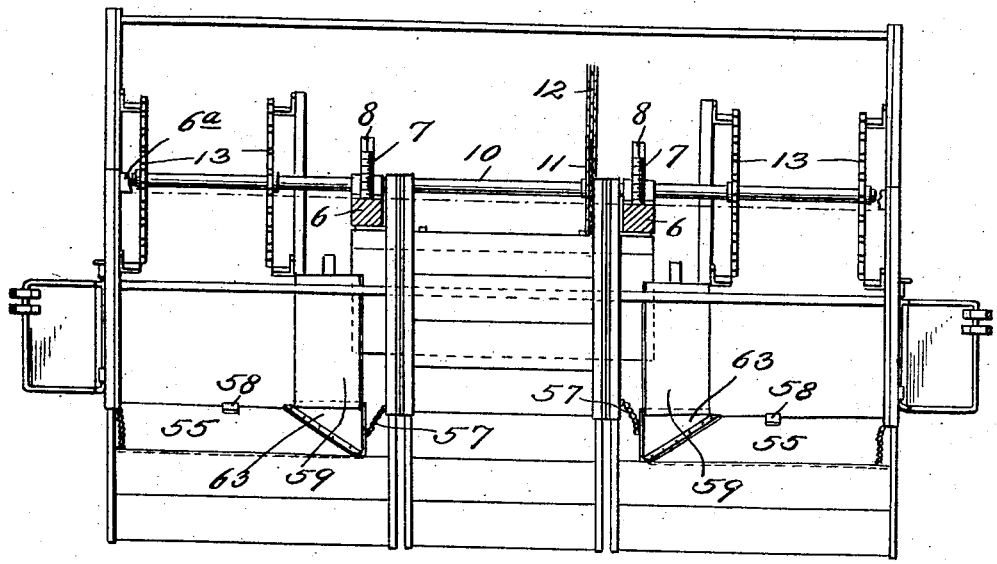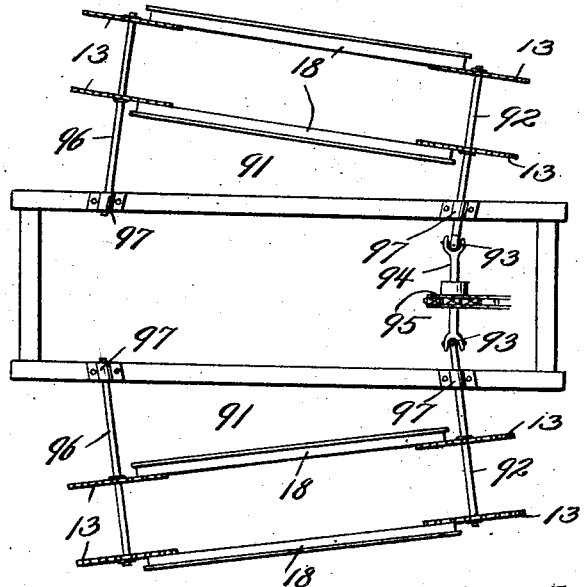

N. E. ROYER.
WATER POWER MECHANISM.
APPLICATION FILED APR. 17, 1918.
1,325,379.
Patented Dec. 16, 1919.
6 SHEETS—SHEET 6.
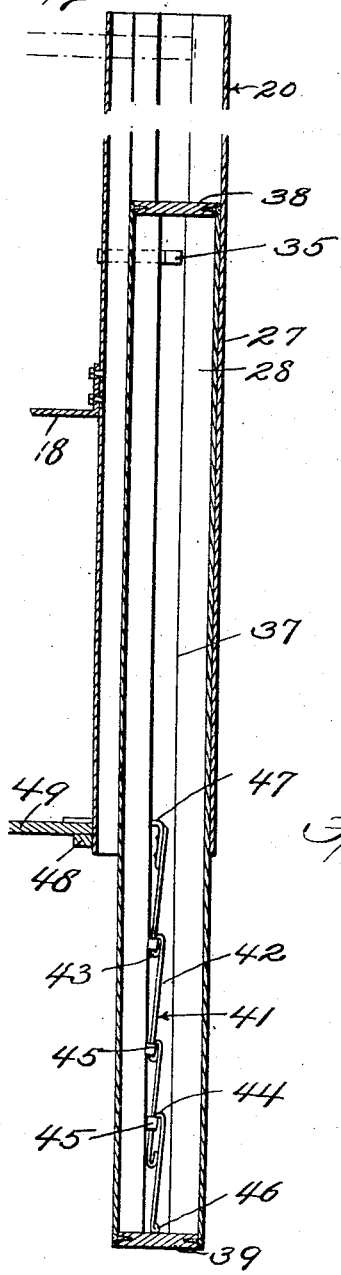
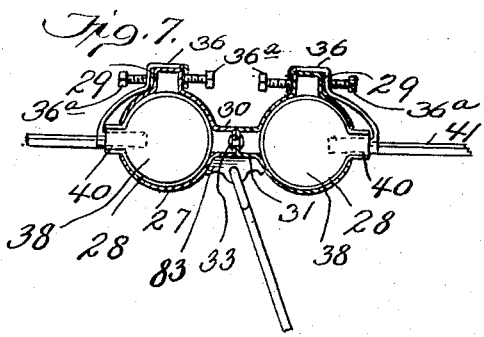
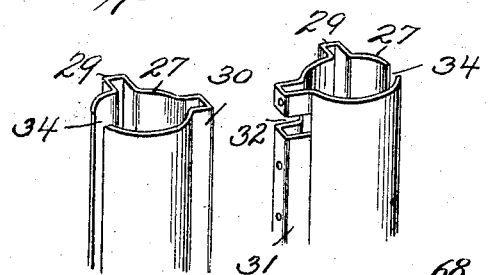
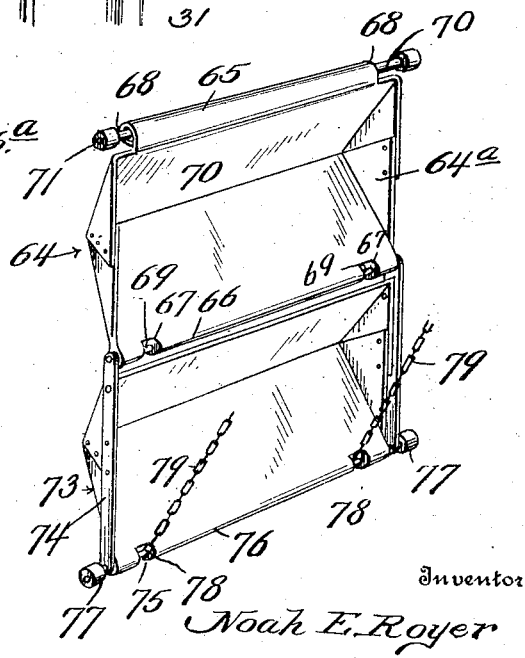
Witness
C. D. Kesler
Chas. S. Hoyer
Inventor
Noah E. Royer
By Amos L. Norris
Attorney

UNITED STATES PATENT OFFICE.

NOAH E. ROYER, OF EMPIRE, CALIFORNIA.

WATER-POWER MECHANISM.

1,325,379.  Specification of Letters Patent.  Patented Dec. 16, 1919.

Application filed April 17, 1918. Serial No. 229,178.

*To all whom it may concern:*

Be it known that I, NOAH E. ROYER, a citizen of the United States, residing at Empire, in the county of Stanislaus and State of California, have invented new and useful Improvements in Water-Power Mechanism, of which the following is a specification.

This invention relates to hydraulic power mechanism of that type embodying a boat or barge disposed in a stream of running water, such as a river, raceway or analogous water current, the boat or barge being anchored in a suitable location in the water current or running stream and may be arranged as a stationary base from which power generated may be conveyed by suitable mechanism to points distant from the boat, barge or base and utilized for operating electric or other machinery, or, for such purposes as motive power is usually employed.

The present invention embodies material features of improvement on the construction disclosed by my Patent No. 1,234,101, dated July 17, 1917.

The primary object of the improvements is to provide means for concentrating the water pressure on the power generating means by an attachment which is automatically movable to compensate for the rise and fall of the water and preventing the water from passing under the supporting boat or base and thereby making the use of side dams and stream control very easy with a resultant increase in the power generated. Another object of the improvements is to cause the water to flow in a materially increased quantity against the power generating device and in rearward and crosswise directions and insure a constant pull on the power generating devices. A further object of the invention is to provide an endless train of double power generating buckets having automatically folding members which close when in inactive power generating positions and positively set in open position when approaching and moved to a point of power generating water impact to increase the efficiency of the buckets in the performance of their functions.

A still further object of the invention is to generally improve water power generating mechanism of the confined water pressure and current actuated type and obtain general maximum efficiency by the use of comparatively simple and inexpensive mechanism that may be readily installed in operative position.

The invention consists in the construction and arrangement of the several parts which will be more fully hereinafter described and claimed.

In the drawings:—

Figure 1 is a top plan view of the improved mechanism showing parts thereof removed.

Fig. 2 is a side elevation, on an enlarged scale, of the improved mechanism with the side protection means for the buckets broken away at one extremity and omitting the adjusting devices for said means, and also illustrating a part of the front extremity of the mechanism omitted.

Fig. 2ª is a side elevation, on an enlarged scale, of the front extremity of the mechanism and a portion of the buckets and operating means and a part of one of the sluices or waterways and folding side wall.

Fig. 3 is a transverse section partially across the mechanism and taken in the plane of the line 3—3, Fig. 2.

Fig. 4 is a transverse vertical section on the line 4—4, Fig. 2ª, the buckets and chain belts being omitted.

Fig. 5 is a transverse vertical section through one of the telescopic posts engaged by slidably folding plates forming a wall around the outer portion of the boat or barge.

Fig. 6 is a detail perspective view of a portion of the wall comprising the folding plates.

Fig. 6ª is a detail perspective view of a pair of the buckets.

Fig. 6ᵇ is a detail plan view of one of the motor buckets.

Fig. 7 is a horizontal section through contiguous telescopic posts and a part of the wall.

Fig. 8 shows detail perspective views of portions of the posts illustrated by Fig. 7.

Fig. 9 is a top plan diagrammatic view, on a reduced scale, of a modified arrangement of the sluices or waterways, the operating mechanism being omitted.

The numeral 5 designates a boat, barge, float or supporting base for the mechanism which may be of any length and width and may comprise a series of similar devices arranged in tandem, which will be an obvious variation to accommodate lengthening of the prime power generating mechanism which will be presently explained. This boat, barge, float or supporting base 5 will be disposed in a current of a river or other naturally flowing stream of water, or, it may be arranged in a raceway or sluice, and in either disposition of the boat, barge, float or supporting base, means will be provided for holding the same in stationary position, as, for instance, by a suitable anchoring rope or cable as attached thereto, or by any other means that may be desired. The boat, barge, float or supporting base will be primarily constructed to provide for a proper depression of the mechanism held thereon relatively to the water, and on the said boat, barge, float or supporting base are longitudinally disposed adjusting beams 6 which carry the power generating mechanism and have a beam 6ª extending across them, as shown broken away in Fig. 4, said beams 6 being engaged at opposite extremities by adjusting means, such as screws 7, preferably constructed and arranged as fully explained in my patent hereinbefore noted. Suitable braces will be applied wherever found necessary to strengthen the several parts. The upper ends of the adjusting screws 7 will be provided with suitable angular heads 8 for engagement therewith of removable cranks or turn wheels and whereby the said screws may be rotated to raise and lower the beams 6 and the mechanism supported thereon. Extending across the forward and rear portions of the beams 6 and mounted in suitable bearings 9 are power shafts 10, one or both of which may carry a sprocket wheel 11, or said wheel may be replaced by a band wheel as an obvious substitution; and from this sprocket wheel 11 a chain belt 12 will extend away from the power mechanism as a whole any desired length for conveying or transmitting the power generated to other mechanism located at a distance therefrom, or, said chain belt may run to and operate other mechanism on the same boat or barge. Each shaft 10 projects outwardly beyond the beams 6 equally at opposite sides of the power mechanism, and on each shaft extremity is a pair of sprocket wheels 13 of any preferred type and which are spaced from each other, the pairs of sprocket wheels on each side being in longitudinal alinement and having trained thereover outer and inner chain belts 14 comprising a series of jointed links 15 having outwardly projecting horizontal rollers 16 at suitable intervals which engage horizontal members 17 of continuous tracks 18. These tracks 18 comprise upper and lower track members terminating in rear of the vertical diameters of the sprocket wheels 13 or terminating short of the positions of the shafts 10, the tracks having the opposite terminals curved downwardly, as at 19, to facilitate the movement onto and from the opposite ends of the track rails of the pairs of chain belts. The tracks or rails 18 will be disposed in upper and lower pairs at opposite sides of the mechanism for engagement with the pairs of belts which are trained over the sprocket wheels 13, and at intervals the outer rails or track members are connected by vertical tubular posts 20, there being one of these posts at each extremity and intermediate similar posts in the present construction. It will be seen that the tracks arranged in upper and lower pairs at each side of the mechanism and connected by the posts provide two track frames which are given a rigid structure by the said posts and also by cross ties 21 extending from the posts 20 and by outer rod braces 22 which run from one post to the adjacent post, as shown. The track frames as just explained are connected by brace devices or ties 23 continuing across the mechanism from one side to the other, as shown by Fig. 1, and connected at their opposite extremities in a manner which will be presently explained. These cross braces or tie devices 23 strengthen and uniformly support the track frames and obviate any tendency of spreading or displacement of said frames. It is obvious that other braces may also be applied to these track frames as may be found necessary to strengthen the same and give them a solid structure to resist the strains imposed thereupon by the power generating mechanism. The shafts 10 also have brace plates 24 engaging the outer ends thereof and secured to a longitudinal brace beam 25 centrally disposed between the outer upper and lower tracks and secured to the posts 20. The inner rails or track members are secured to solid posts 26 rising from parts of the frame structure, as shown by Fig. 3. It will be understood that this construction is duplicated in connection with each track frame and shaft and the latter are held against spreading or springing. The chain belts 14 regularly travel over the sprocket wheels 13 and pass inwardly and outwardly over the curved extremities or ends 19 of the tracks 18 without friction or resistance or the least interference with the operation of the said chain belts.

The posts 20 are preferable arranged in pairs at the opposite sides and front of the improved mechanism, each of the pairs comprising a fixed tubular post 27 and a tubular post 28 movable or telescopically mounted in the post 27, both posts being essentially of the same construction, except as to length and details, to accommodate the movement of one post within the other. The front central posts are shorter than the side posts and only extend upwardly to the beam 6ª, and the front corner posts are the same length as the central posts. These pairs of posts are shown in detail by Figures. 5, 7, and 8, and each post 27 has an inwardly projecting tubular rib 29 to which the tracks 18 are bolted. The tubular ribs 29 extend full length of the fixed tubular post 27 so as to provide for attachment of not only the tracks, as just explained, but for other parts which will be hereinafter specified. The one post 27 has a tubular rib 30 projecting in a sidewise direction therefrom or in a plane at right angles to the rib 29, and the adjacent post 27 has a similar rib 31 with a slot 32 cut through the upper extremity thereof to receive the end of one of the cross braces or tie beams or devices 23 which is secured by suitable means in the slot. The two ribs 30 and 31 are closely abutted, as shown by Fig. 7, and riveted or bolted, as at 33, and whereby both posts of each pair are firmly secured. At points diametrically opposite the ribs 30 and 31 the posts 27 are each formed with a slot 34 extending full length thereof, and projecting into these slots at a suitable elevation are stop bars 35, one bar in each slot, each bar being extended outwardly through the slot and curved and provided with a clip 36 having set-screws 36ª secured to the sides of the ribs 29, as clearly shown by Fig. 7. Each telescopic post 28 mounted in the post 27 is also formed with a slot 37, as shown by Fig. 5, extending full length thereof, the said post 28 having upper and lower closing caps 38 and 39, the upper cap being provided with an outwardly extending guide projection 40 which is movable in the slots 34 and 37 and operates to maintain the inner post 28 in proper alinement and operative association with respect to the post 27 in which it moves or telescopes. The upper cap 38 is adapted to bear on the stop bar or inwardly projecting stop 35 when the post 28 has reached its lowermost predetermined adjustment relatively to the post 27, and the lower cap 39 serves as a retaining means and limiting device for the downward movement of an automatically operating folding wall 41 which is composed of a plurality of plates 42 of the form and character shown in detail by Fig. 6, each plate having a lower outer upturned hooked extremity 43 and all the plates, except the uppermost plate, also having an upper inturned and downwardly projecting hooked extremity 44 and a clip 45 extending rearwardly and inwardly over a portion of the adjacent plate so as to insure a constant operative association of all of the plates and a jointure of the hooked extremities 43 and 44. The several plates 42 have loose movement relatively to each other or do not in any manner bind one upon another so that they may be free to readily collapse or fold or be automatically distended by gravitation. The lower edge 46 of the lowermost plate is rolled or beaded, as shown by Fig. 5, and adapted to engage the lower cap 39 and thereby hold the wall against projection below the lower end of the post 28. The upper plate or wall section 42 has an angle strip or catch 47 secured thereto and adapted to engage a stop means during the descent of the wall and the tubular post 28, and by this means a hanger is provided which permits the remaining plates or sections to be suspended in a positive manner from a point which will be presently explained. The operation of the posts 28 and the side and front walls 41 is entirely automatic and depends upon the depth of water in which the improved mechanism is disposed, the posts 28 and the walls having a self-adjustment in accordance with the water, and if the mechanism is disposed in a stream affected by tides, the said posts and walls will have a self-adjustment relatively to the depth of water modified in accordance with the change of tides. The walls 41 extend between the posts 27 and 28 and project into these posts through the slots 34 and 37; or, in other words, the walls are made in sections extending between the pairs of posts, the ends of the walls being held within the posts and forming a damming or inclosure means around the front and sides of the barge or boat. At the rear of the mechanism, the walls are continued, as shown by Fig. 1, by short sections 48ª, the rearmost posts 27 and 28 having the slots 34 and 37 in corresponding positions and in alinement with similar slots in a wing posts 49ª secured to a continuation of the rearmost brace or cross tie 23, said wing posts 49ª being shorter than the side posts or similar to the front central and front corner posts. These right angular rear extensions 48ª of the side walls operate to insure a practical damming of the water or an obstruction at the rear to prevent the water from flowing past or escaping at these points and thus defeat the purpose of directing the water fully against the buckets coming into position at the front of the mechanism.

To the inner portions of the lower extremities of the ribs 29 of the fixed posts 27 a supporting rail 48 is secured and provides a ledge for the outer edge of a floor 49 extending full length under the buckets and also beyond the rearmost post 27, as shown by Fig. 3. This floor extends inwardly almost to the sides of the boat or barge, as shown by Fig. 3, and above the same is a frame comprising longitudinal members or small beams 50 and 51 and between these members and the floor a plurality of deflectors 52 are mounted and disposed at rearward angles of inclination, as shown by Fig. 1. said deflectors being formed of imperforate sheets of suitable material, such as sheet metal, and having rolled end edges 53 in which rods 54 are mounted and project at the ends and fitted in suitable openings or sockets secured respectively to the frame members 50 and 51 and the floor 49. As hereinbefore explained, the cross-beams 6<sup>a</sup> and 23 bear on the beams 6 and project outwardly at opposite sides of the boat or barge to the outer pairs of side posts and support the working mechanism. These cross-beams are located between the sprocket wheels, there being one close to each wheel and as many between the wheels as may be found necessary. The longitudinal beam or member 51 is suspended and positively held by rods 50<sup>a</sup> depending from the beams 23. The posts 26 on opposite sides have their lower ends bearing on the beams or members 50 and do not interfere with the open spaces between the deflectors below. By this means, a sluice-like structure is provided with inner deflectors, and to cause the water to flow with force and impact over the floor, the front end of the latter has a downwardly extending angular section 55, as clearly shown by Fig. 4, said downwardly extending angular section being hinged, as at 56, to the front edge of the floor 49 and having chains 57 secured to the outer depressed end thereof to limit the downward movement of the same. The angular section 55 is held depressed by a flat spring 58 secured to the floor, as shown by Figs. 1, 2 and 4 and extending over a suitable distance onto the section 55. At the inner side edge of the depressed or downwardly extending angular section 55 is a shield or guard 59 extending from points adjacent to the inner posts 27 at the front of the mechanism and then rearwardly at an outward angle of inclination toward the inner front sprocket wheel on each side and then rearwardly in the form of a straight extension 60 under a forwardly projected extremity 61 of the frame member 50, the extension 60 being suitably fastened between the forwardly projecting extremity 61 and the floor 49 below through the medium of rods carried by the said extension 60 in a manner similar to the deflectors 52. The object of the guard or deflector 59 is to direct and confine the water entering over the downwardly depressed angular floor section 55 and to direct the flow regularly over the floor and in engagement with the buckets. At the rear extremity of the floor and at each side of the mechanism is a shield 62 on the outer side of the outermost sprocket wheel at the rear, as shown by Figs. 1 and 2, to prevent the water from flowing off laterally at the rear portion of the floor and to effect a full impact of the water throughout the whole series of buckets as far rearwardly as possible to obtain the full benefit of the water impact and also to prevent lateral inflow of the water at the rear of the floor that might interfere with the flow of the water through the sluice provided at each side by the formation of the floor. The front downwardly inclined section 55 of the floor also has an angular guard 63 secured to the inner edge thereof which overlaps the lower edge of the guard or shield 59 but is not fastened to the latter so that the said guard 63 may move vertically with the floor section 55 and close to the inner side of the said guard 59. Should the water become low and the mechanism as an entirety consequently depress, all of the movable parts will automatically adjust themselves to a variation in the depth of the water as hereinbefore explained, and in the event that the bottom of the boat, barge or base is brought to bear on the bed of the river, stream or other water supply, the downwardly inclined floor sections 55 will not be in the least injured as the latter will be moved upwardly against the resistance of the springs 58 and the guards 63 will likewise move therewith, and after the water rises again and the barge, boat or base floats, the said floor section 55 and guards 63 will be moved downwardly in proportion by the action of the springs 58, and, likewise, the posts 28 will depress together with the walls 41 at the sides and front of the mechanism. It will be understood that the walls 41 will project from the outer edge of the floor 49 and thereby fully dam the front and sides of the boat, barge or base to prevent the water from running under the latter and thereby cause the water to be directed with more effectiveness and in larger quantity or volume over the inclined floor sections 55 and floor 49 in engagement with the buckets. The angular members or hangers 47 loosely bear upon the outer edge portions of the floors 49 between the posts 27 or other adjacent projecting parts of the boat or barge so as to insure a practical distention of all the plates relatively to each other in accordance with the depth of water into which the plates automatically move with the posts 28. When the posts 28 move upwardly and the plates collapse far enough to relieve the stress or engagement of the angular members or hangers 47 with relation to the edges of the floors 49, the said members or hangers rise or clear the floors but are always held in position for engagement with the floors by retention of the walls as a whole in the posts as hereinbefore explained.

Movably attached to the chain belts 14 at regular intervals are pairs of buckets 64 and 73, preferably constructed of sheet metal and bent into triangular form and having closed ends 64<sup>a</sup>, the bucket 64 having upper and lower roller bearings 65 and 66. As shown by Fig. 6<sup>b</sup>, the ends 64<sup>a</sup> of the buckets flare in V-shape to provide for closer nesting or packing for convenience in shipping. By the angular construction of these buckets as just specified, one side of each is fully open and it is preferred that each bucket be formed from a piece of sheet metal of suitable rigidity that may be treated in such manner as to render the same non-corrosive. The lower bearing 66 is slotted, as at 67, near each end thereof, and the upper bearing 65 is shortened relatively to the lower bearing to form angular recesses 68 at the ends thereof so as to give the same ample clearance for insertion between the jointed links 15 of the pairs of chain belts 14, rods or pintles 69 being inserted in the lower bearings and terminally held at opposite ends in transversely alined links of the said chain belts. The pairs of buckets have free rocking or swinging and folding and unfolding movements and are permitted to shift sufficiently to pass around the sprocket wheels 13. In the upper bearings 65 rods 70 are mounted and project outwardly beyond the bearings 65 and the chain belts 14 and have rollers 71 mounted on the ends thereof to engage the tracks 18, as clearly shown by Fig. 3, to hold the buckets steady and give them ample anti-frictional bearing relatively to the said tracks. As in my patented structure, the rods of these buckets, wherever found necessary, will be of duplicate form and adjustable so as to effect a positive engagement of the rollers thereon at all times with the tracks 18 and compensate for wear or to provide for other irregular movement of the chain belts. Moreover, the chain belts may be adjusted and the buckets shifted either inwardly or outwardly to maintain the belts in proper alinement relatively to the sprocket wheels 13. Brace rods 72 are movably connected to the rods 69 of one set or pair of buckets through the slots 67 and extend upwardly and engage the rods or pintles 70 of the next set or pair of buckets close to the opposite terminals of the bearings 65. The brace rods 72 are arranged in pairs between the buckets and operate to strengthen the latter and maintain them in positive resisting position relatively to the water-pressure coöperating therewith, but at the same time permitting the buckets to assume a variation in angle or to move freely when rounding or passing over the sprocket wheels 13. The auxiliary bucket 73, as clearly shown by Fig. 6ª, is constructed essentially the same as the main bucket 64. The rod 69 of each bucket 64 is extended at the ends or made longer than the bearing 66 to provide for metal pivotal connection thereto of straps 74 which are secured to the opposite ends of the supplemental or auxiliary bucket 73 and also engage a rod 75 in a lower rolled or bearing edge 76 of said supplimental bucket, the rod 75 being extended beyond the straps and provided with rollers 77 on the outer ends thereof. The rolled bearings 76 are also slotted, as at 78, for the attachment of chains 79, as shown by Fig. 6, said chains extending from the rods 75 of each supplemental bucket 73 to the rods 69 of the main buckets 64 ahead of the said supplemental buckets, and whereby the supplemental buckets have a flexible or movable braced retention but are free to swing over or fold on the main buckets when the buckets travel to their uppermost level or are in engagement with the upper tracks, as shown by Fig. 2. As the double buckets come around to the front end of the mechanism, the rollers 77 engage segmental flanged setting tracks 79ª held by a part of the posts 27 and by means of which the supplemental buckets 73 are turned or guided in proper position and fully opened as the main buckets travel with the chain belts around the sprocket wheels, as clearly indicated by Fig. 2. The use of the double buckets arranged as specified provides for a greater bucket surface to be operated upon by the impact of the water and causing a heavier pull where the water is deep enough for the use of this type of bucket. If the water is shallow, there will be no interference in the operation of the buckets through the supplemental buckets as the water will then affect the main buckets and the supplemental buckets will automatically accommodate themselves to the shallowness of the water, but it is preferred that the double bucket be used and in view of the fact that the flow of water through the sluice-ways at each side of the mechanism as provided by the floors 49 will insure engagement with at least a part of the buckets and a full flow of water filling the vertical space above the floor will engage both buckets of each set and increase the power of the mechanism.

In the present instance the improved mechanism also includes means 80 for protecting the buckets against engagement with trash or floating debris and for assisting as an auxiliary in damming the water relatively to the buckets. Between the pairs of posts 27 bearing brackets 83 are secured, as clearly shown in detail by Fig. 7, and thereto swinging rod frames 84 of U-shaped form are secured to which sheet metal webs 85 are attached, the rod frames having parallel guard bars 86 secured to the outer members thereof. To the front extremities of the guard bars 86 inwardly converging bars 87 are secured in advance of the front extremity of the boat, barge, float or supporting base. Through this connection the guard bars 86 and the frames 84 with their webs 85 are simultaneously adjusted to change the angle of the said frames and webs, as indicated by full and dotted lines in Fig. 1.

In the present improved construction, the longitudinal beams 6 are extended a suitable distance in advance of the front end of the barge or boat 5, as shown by Figs. 1 and 2ª, without in the least interfering with the front hanging wall sections or trash shields, as the latter are below said beam extensions. The object of extending these beams 6 is to provide for the support of a water lift 88 in advance of the front end of the boat or barge. This water lift 88 has the rear lowermost portion thereof in line with the floors of the sluices and from this lowermost portion the front side 89 inclines upwardly and forwardly. This lift is also the same in width as the boat or barge. The purpose of this lift is to maintain the front end of the boat or barge in normal position by preventing said boat or barge end from dipping in the water when under current stress and thereby also obstruct overturning of the boat or barge and mechanism carried thereby. When the water strikes the front inclined side 89, the tendency is to elevate the front of the boat or barge and counteract the depressing effect or down pulling tendency of the water engaging the straight hanging wall at the front of the boat or barge. A beam 81 extends forwardly from the central top portion of the lift 88 and is secured to a cross beam 90 forming part of this lift, the latter being of such strong structure as to give ample support to said beam and also to resist maximum water-pressure strain during the performance of its function. In the present improvement, a toothed segment 81ª and lever 82 are mounted on the beam 81 and thereby are moved outwardly a greater distance from the front end of the boat or barge end, and the link connections between the front ends of the converging bars 87 and the front frame structure disclosed by my patent aforesaid are dispensed with, the lever 82 being directly connected in the present structure to the bars 87.

In the modified construction shown by Fig. 9, the operating organizations at opposite sides of the boat or barge and including the sluices or waterways constructed as hereinbefore explained and having the endless chain belts and buckets operating therein as the power generating mediums are disposed to have a rearward divergence relatively to the opposite sides of the boat or barge so as to form wider spaces 91 at the rear to give the water more room to pass through by providing a greater capacity for quick discharge at the rear. A further advantage of this modified construction is that when the water is high and deep it cannot be controlled fully by side dams, and, hence, there must be a rapid rear relief or discharge to provide for a greater flow of water into and through the sluices. In this modified structure, two shafts 92 of the front pairs of power generating sprocket wheels are used and disposed at inwardly trending angles and connected at their inner ends by universal joints 93 to the opposite ends of the power shaft 94 carrying a sprocket or other wheel or pulley 95. Two shafts 96 for the rear pairs of power generating sprocket wheels are used and also disposed at angles corresponding to the front shafts 92, the shafts 92 and 96 having mountings in suitable angularly disposed bearings 97 at opposite sides of the boat or barge 5.

One of the most important structural and operative advantages of the present invention is the capability of adjusting the sluices or waterways so that they will have a downward inclination from the front toward the rear ends thereof. This is accomplished by so manipulating the front adjusting screws 7 to raise the front portions of the mechanisms and the sluices or waterways higher than the rear portions of said components. By damming the water through the medium of the suspended collapsible walls heretofore explained and then adjusting the sluices and operating mechanism to assume a rearward downward incline, the water running through the sluices and over the floors 49 of the latter will have a greater velocity and a stronger and more efficient pull on the buckets with material advantage in generating greater power than when sluices and operating mechanism are disposed horizontally straight.

The operation of the power mechanism will be readily understood from the foregoing disclosure and will be found to be exceptionally useful and advantageous for economically generating power for various uses, and, as heretofore indicated, the structure may be lengthened by duplicating the mechanism or by extending the chain belts and correspondingly increasing the length of the supporting base and varying the proportions of the several parts.

What I claim is:—

1. In a water-power mechanism, a supporting base disposed in a stream of water, a plurality of water-operated buckets connected for sequential movement and arranged at opposite sides of the mechanism, a power shaft operated by the said buckets, surrounding walls movably supported at the sides and front of the base and having an automatic operation in accordance with the depth of water to cause the water to be dammed relatively to the buckets, and guards at opposite sides of the base at a distance outwardly from the walls converging in advance of the front extremity of the base.

2. In a water power mechanism, a supporting base disposed in a stream of water, a plurality of water-operated buckets each composed of two bucket members, the one member being automatically foldable and unfoldable in relation to the other and all of the bucket units connected for sequential movement and disposed at opposite sides of the mechanism, a power shaft operated by said plurality of buckets, and sluices at opposite sides of the base having floors over which the buckets move.

3. In a water-power mechanism, a supporting base disposed in a stream of water, a plurality of water-operated buckets connected for sequential movement and disposed at opposite sides of the mechanism, sluices having horizontal floors through and over which the buckets have movement, automatically movable sections attached to the ends of the floors of the sluices and downwardly inclining to cause a greater inflow of water into the sluices, surrounding walls movably supported at the sides and front of the base to cause the water to dammed relatively to the buckets, converging guard means in advance of the front extremity of the base and extending rearwardly at opposite sides of and parallel to the base, and a power shaft operated by the said plurality of buckets.

4. In a water-power mechanism, a supporting base disposed in a stream of water, a plurality of water-operated buckets connected for sequential movement and arranged at opposite sides of the mechanism, sluices having horizontal floors through and over which the buckets have movement, the said floors having end hinged sections normally depressed at angles of inclination and automatically movable relatively to the sluices, upwardly extending guards at the inlets and outlets of the sluices in reverse positions, the end hinged sections of the sluice floors having an automatic rising and falling movement close and relatively to the inlet guards, surrounding walls movably supported at the sides and front of the base and automatically movable in a vertical direction, means at opposite sides and converging in advance of the front extremity of the base for deflecting trash and floating debris away from the walls and buckets, and a power shaft operated by said plurality of buckets.

5. In a water power mechanism, a supporting base disposed in a stream of water, a plurality of water-operated buckets connected for sequential movement and disposed at opposite sides of the mechanism, sluices having horizontal floors through and over which the buckets have movement, hinged sections disposed at the inlets of the sluices and mounted for automatic movement and having a normal downward inclination, upright fixed fenders at the inner portions of the said sections and inclining away and forwardly from the latter, the hinged sections being movable vertically relatively to the fixed fenders and always providing with the latter closures at the lower portion thereof to prevent lateral flow of the water between the fenders and the inner portions of the said sections, guards carried by the inner portions of the said sections and coöperating with said fenders, rear fenders disposed at the outer portions of the sluices, and a power shaft operated by the said buckets.

6. In a water power mechanism, a supporting base disposed in a stream of water, a plurality of water-operated buckets connected for sequential movement and disposed at opposite sides of the mechanism, said buckets comprising two members of similar construction and form and one movable with relation to the other and connected by braces a portion of which are flexible, segmental tracks for disposing the folding members of the buckets in operative position, and a power shaft operated by the said buckets.

7. In a water power mechanism, a supporting base disposed in a stream of water, sluices arranged at opposite sides of the base and having horizontal floors, and inner stationary deflectors, means at the inlet ends of the sluices vertically movable in relation to the deflectors for causing an increased flow of water therethrough, a plurality of buckets each composed of two members, one foldable in relation to the other and all connected for sequential movement, and disposed to travel through the sluices over the floors of the latter, and a power shaft operated by the said buckets.

8. In a water power mechanism, a supporting base having a fixed position in a stream of water, endless belts arranged at opposite sides of the base, a plurality of buckets fully open at one side and normally disposed in a plane at right angles to the belts, a supplemental bucket foldably attached to each of the foregoing buckets, each set of buckets being practically of the same form and construction, and a power shaft actuated by the belts and buckets.

9. In a water power mechanism, a plurality of pairs of posts fixed to opposite sides at the front portion thereof, additional pairs of posts telescopically engaging the fixed posts, a foldable wall extending into and carried by and movable with the telescopic posts to form side and front water dams for the mechanism and prevent the water from flowing under the supporting base, a plurality of water-operated buckets connected for sequential movement and disposed at opposite sides of the mechanism at a distance inwardly from the posts and wall, and a power shaft operated by the said buckets.

10. A water-power mechanism comprising a supporting base, a plurality of water-operated buckets movable in relation to opposite sides of the base and each composed of two bucket members, the one bucket member being automatically foldable and unfoldable in relation to its companion member and all of the bucket units connected for sequential movement over the base, a power shaft operated by said buckets, and automatically operating self-adjustable damming walls at the sides and front of the base.

11. A water-power mechanism comprising a supporting base, a plurality of water-operated buckets, each comprising two bucket members with one foldable upon the other and all the bucket units connected for sequential movement and disposed at opposite sides of the mechanism, a power shaft operated by the said buckets, sluices at opposite sides of the mechanism through which the buckets move and provided with means for causing water to flow rearwardly therethrough and inwardly to fully impact against the buckets, and an automatically movable wall disposed at opposite sides and at the front extremity of the base to increase the flow of water through the sluices.

12. In a water power mechanism, a supporting base disposed in a stream of water, a plurality of water-operated buckets connected for sequential movement and disposed at opposite sides of the mechanism, a power shaft operated by the said plurality of buckets, pairs of fixed tubular posts at the opposite sides and front portion of the base, said posts having ribs for attaching them to each other in pairs and other ribs for securement of different parts of the mechanism, tubular posts telescopically mounted in the fixed posts, the telescopic posts and fixed posts having alining slots, and the telescopic posts provided with caps having guide projections extending through the said slots, and movable walls composed of telescoping sections also extending through the slots of the posts and supported by and movable with the telescopic posts, the said walls being disposed at opposite sides and at the front portion of the base.

13. In a water power mechanism, a supporting base disposed in a stream of water, a plurality of water-operated buckets each composed of two bucket members, one automatically foldable and unfoldable with relation to the other and all connected for sequential movement and disposed at opposite sides of the mechanism, and a power shaft operated by the said buckets.

In testimony whereof I have hereunto set my hand in presence of two subscribing witnesses.

NOAH E. ROYER.

Witnesses:
   C. A. LUNDELL,
   LYMAN C. LEE.